United States Patent
Chaloux et al.

(10) Patent No.: US 11,780,860 B2
(45) Date of Patent: Oct. 10, 2023

(54) SUBSTITUTED CYANOPHOSPHINE ADDITIVES FOR LITHIUM CONDUCTING CARBON PHOSPHONITRIDES

(71) Applicant: The Government of the United States of America, as represented by the Secretary of the Navy, Arlington, VA (US)

(72) Inventors: Brian L. Chaloux, Washington, DC (US); Andrew P. Purdy, Washington, DC (US); Albert Epshteyn, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 17/983,662

(22) Filed: Nov. 9, 2022

(65) Prior Publication Data

US 2023/0174563 A1    Jun. 8, 2023

Related U.S. Application Data

(60) Provisional application No. 63/286,355, filed on Dec. 6, 2021.

(51) Int. Cl.
*C07F 9/50* (2006.01)

(52) U.S. Cl.
CPC ................... *C07F 9/5036* (2013.01)

(58) Field of Classification Search
CPC ..................................... C07F 9/5036
USPC .......................................... 558/385
See application file for complete search history.

(56) References Cited

U.S. PATENT DOCUMENTS 9,409,936 B2    8/2016  Epshteyn et al.
10,510,458 B2   12/2019 Epshteyn et al.

OTHER PUBLICATIONS

"A solid, amorphous, lithiated carbon phosphonitride displaying lithium ion conductivity," A.P. Purdy et al. J. Solid State Chem. 2022, 305, 122649.
"P(CN)3 Precursor for Carbon Phosphonitride Extended Solids," B.L. Chaloux et al. Chem. Mater. 2015, 27 (13), 4507.

*Primary Examiner* — Kristin A Vajda
(74) *Attorney, Agent, or Firm* — US Naval Research Laboratory; Roy Roberts

(57) ABSTRACT

Cyanophosphines other than $P(CN)_3$ react with lithium dicyanamide to produce lithiated carbon phosphonitrides with mobile $Li^+$ ions.

2 Claims, 1 Drawing Sheet

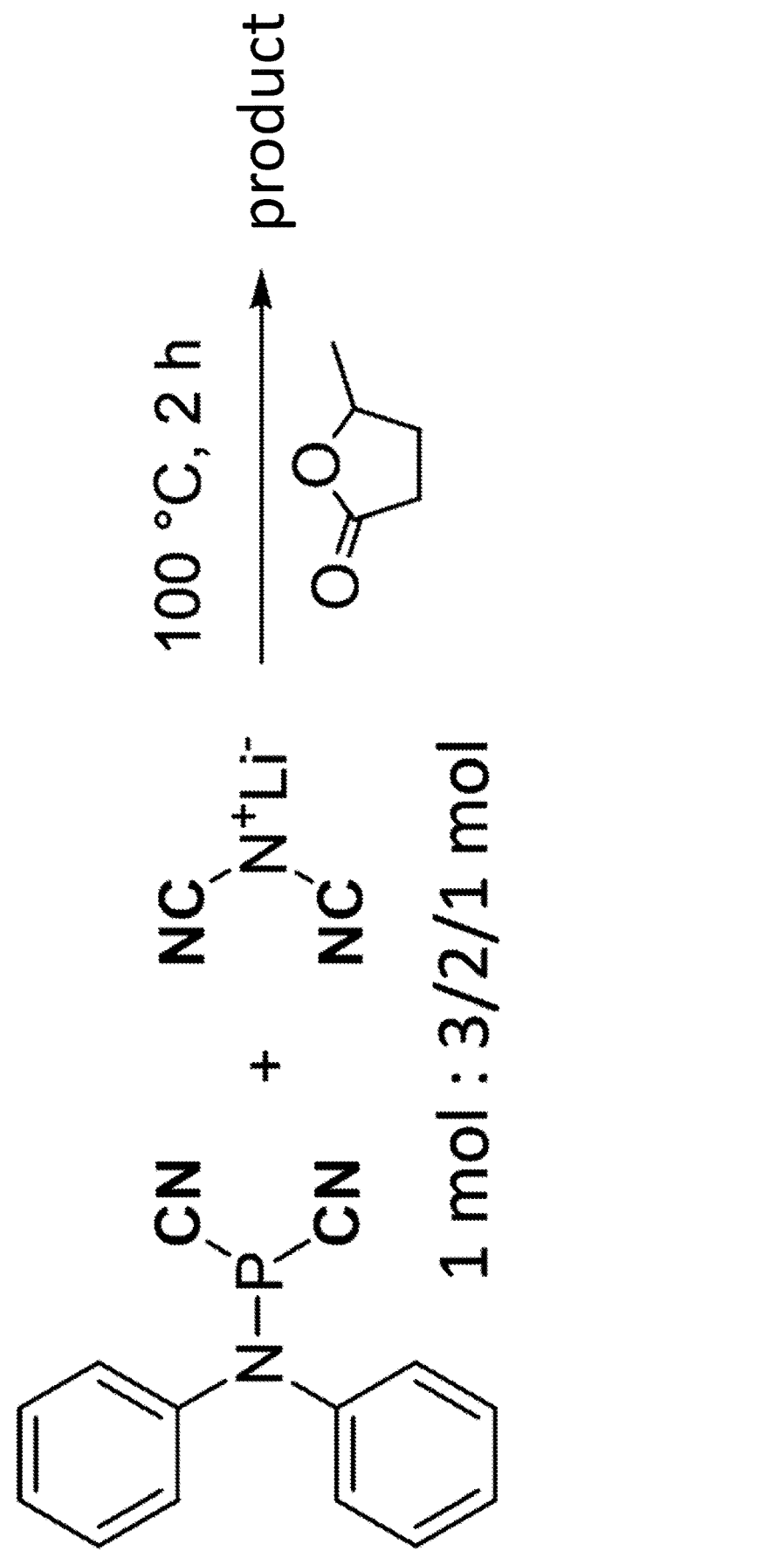

SUBSTITUTED CYANOPHOSPHINE ADDITIVES FOR LITHIUM CONDUCTING CARBON PHOSPHONITRIDES

CROSS-REFERENCE TO RELATED APPLICATIONS

This Application claims the benefit of U.S. Provisional Patent Application Ser. No. 63/286,355 filed on Dec. 6, 2021, the entirety of which is incorporated herein by reference, and is related to U.S. Pat. Nos. 10,510,458 and 9,409,936.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 210918.

BACKGROUND

Lithium ion conducting carbon phosphonitride polyelectrolytes were documented in U.S. Pat. No. 10,510,458 and in "A solid, amorphous, lithiated carbon phosphonitride displaying lithium ion conductivity," A. P. Purdy et al. *J. Solid State Chem.* 2022, 305, 122649. As non-flammable materials produced by the reaction of lithium dicyanamide (LiN(CN)$_2$) with phosphorus tricyanide (P(CN)$_3$) in mutual solvents, they exhibit potential for replacing the highly flammable separator materials in lithium ion batteries that make these batteries dangerous and prone to combustion. These lithium-containing carbon phosphonitrides are structurally similar to and derived from similar materials as C$_3$N$_3$P, a stoichiometric carbon phosphonitride described in U.S. Pat. No. 9,409,936 B2 (6 Aug. 2015) and article "P(CN)$_3$ Precursor for Carbon Phosphonitride Extended Solids," B. L. Chaloux et al. *Chem. Mater.* 2015, 27(13), 4507.

A need exists for new lithium-containing carbon phosphonitrides as well as methods for the preparation thereof.

BRIEF SUMMARY

In a first embodiment, a method of preparing lithiated carbon phosphonitride material comprises reacting LiN(CN)$_2$ with a derivatized cyanophosphine, optionally not tricyanophosphine.

Another embodiment is a lithiated carbon phosphonitride material in a state of having been made by a method of the first embodiment.

BRIEF DESCRIPTION OF THE DRAWINGS

FIG. 1 illustrates an exemplary method for preparing lithiated carbon phosphonitride material by reacting LiN(CN)$_2$ with (diphenylamino)dicyanophosphine in γ-valerolactone.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

As described herein, lithiated carbon phosphonitride materials, previously described in U.S. Pat. No. 10,510,458, can be produced not only from the reaction of lithium dicyanamide (LiN(CN)$_2$) with tricyanophosphine (P(CN)$_3$), but from the reaction of LiN(CN)$_2$ with any other derivatized cyanophosphine. Cyanophosphines are defined herein as phosphorus compounds bearing one or more cyano/nitrile (CN) substituents (i.e. P—CN) with organic substituents comprising the remainder of functional groups on phosphorus (e.g. R$_{3-x}$P(CN)$_x$ where x is 1, 2, or 3).

In various aspects, lithiated carbon phosphonitrides so produced are free of, or nearly free of, elements other than carbon, phosphorus, nitrogen, and lithium. Such contaminants might be present at less than 5%, 4%, 3%, 2%, or 1% by mass.

Example

In a nitrogen filled drybox, a stock solution of lithium dicyanamide was prepared by dissolving 10 mmol (0.730 g) LiN(CN)$_2$ in 9.7 mmol (1.165 g) anhydrous sulfolane and 83.4 mmol (8.350 g) anhydrous γ-valerolactone. Three NMR-scale reactions (A, B, and C) were prepared from this stock solution by dissolving (diphenylamino)dicyanophosphine (Ph$_2$NP(CN)$_2$) at varying molar ratios in 0.5 gram aliquots of stock solution. "A" was prepared by dissolving 40.9 mg (0.163 mmol) Ph$_2$NP(CN)$_2$ in 0.5 grams stock solution (3:1 LiN(CN)$_2$ to cyanophosphine molar ratio); "B" was prepared by dissolving 61.3 mg (0.244 mmol) Ph$_2$NP(CN)$_2$ in 0.5 grams stock solution (2:1 LiN(CN)$_2$ to cyanophosphine molar ratio); and "C" was prepared by dissolving 122.6 mg (0.488 mmol) Ph$_2$NP(CN)$_2$ in 0.5 grams stock solution (1:1 LiN(CN)$_2$ to cyanophosphine molar ratio).

The NMR tubes were flame sealed under vacuum and $^1$H, $^7$Li, and $^{13}$C NMR spectra acquired in the absence of heating. The three samples were subsequently heated to 100° C. for 2 hours in a water bath, after which the viscosity of each solution increased substantially and the color darkened from red to almost black. NMR spectra were subsequently acquired on these materials, from which speciation before and after heating was assessed.

All reactions showed significant consumption of the dicyanamide anion, with the highest molar ratio (reaction "C", 1:1 LiN(CN)$_2$ to Ph$_2$NP(CN)$_2$) being most viscous and showing only 10% of the initial dicyanamide content remaining after 2 hours at 100° C. Likewise, Ph$_2$NP(CN)$_2$ is consumed over the course of reaction in each of the three samples, with reaction "C" exhibiting only 70% of the initial $Ph_2NP(CN)_2$ content after heating for 2 hours. Despite the consumption of both dicyanamide and cyanophosphine, $^7Li$ diffusion ordered NMR spectra (DOSY) show that Li diffuses faster, on average, post-reaction than pre-reaction, demonstrating that $Li^+$ remains a mobile species despite the oligomerization of starting materials.

Further Embodiments

Solvents may comprise any polar aprotic liquids that exhibit mutual solubility for lithium dicyanamide and cyanophosphine, and are therefore not limited to γ-valerolactone and sulfolane (as described in the example) or acetonitrile, dimethoxyethane, and pyridine (as described in U.S. Pat. No. 10,510,458). Likewise, cyanophosphine reagents are not limited to $P(CN)_3$ and $Ph_2NP(CN)_2$, but may additionally comprise any mono- or dicyanophosphine substituted with an organic substituent. (Diphenylamino)dicyanophosphine was chosen as an example due to its ease of synthesis and solubility in a variety of solvents.

Utilizing (diphenylamino)dicyanophosphine ($Ph_2NP(CN)_2$) as a reagent to produce lithiated carbon phosphonitrides is an alternative to the use of phosphorus tricyanide ($P(CN)_3$) as described in U.S. Pat. No. 10,510,458. Reaction of these two materials with lithium dicyanamide ($LiN(CN)_2$) is the only currently known way of making lithiated carbon phosphonitride. The properties of lithiated carbon phosphonitride made with different reagents may vary based on the chosen cyanophosphine reagents, but these materials should be considered related compounds Advantages This is believed to be the first example of cyanophosphines other than $P(CN)_3$ reacting with lithium dicyanamide to produce lithiated carbon phosphonitrides with mobile $Li^+$ ions. This technology significantly expands the range of precursors that can be used to prepare lithiated carbon phosphonitride, with implications for modifying critical materials properties, including mechanical strength, glass transition temperature, and electrochemical stability.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. A method of preparing lithiated carbon phosphonitride material, the method comprising reacting $LiN(CN)_2$ with (diphenylamino)dicyanophosphine.

2. A method of preparing lithiated carbon phosphonitride material, the method comprising reacting $LiN(CN)_2$ with (diphenylamino)dicyanophosphine in γ-valerolactone.

\* \* \* \* \*